United States Patent [19]

Lathan

[11] Patent Number: 5,586,339
[45] Date of Patent: Dec. 24, 1996

[54] OUTER PROTECTIVE GARMENT APPARATUS

[76] Inventor: Betty S. Lathan, P.O. Box 184 Keuer Rd., Mount Airy, Ga. 30563

[21] Appl. No.: 396,252

[22] Filed: Feb. 28, 1995

Related U.S. Application Data

[63] Continuation of Ser. No. 55,276, May 3, 1993, abandoned.

[51] Int. Cl.$^6$ .............................. A41D 1/00; A41D 13/00; A41D 27/00
[52] U.S. Cl. ................. 2/46; 2/69; 2/69.5; 2/79; 2/227
[58] Field of Search .................. 2/2, 46, 50, 48, 2/69, 69.5, 70, 105, 106, 79, 75, 80, 114, 83, 84, 87, 82, 81, 87, 227, 275, 59

[56] References Cited

U.S. PATENT DOCUMENTS

| | | | |
|---|---|---|---|
| Re. 27,348 | 5/1972 | Bradley | 2/114 |
| 2,442,749 | 6/1948 | Callahan et al. | 2/87 |
| 2,668,294 | 2/1954 | Gilpin | 2/114 |
| 3,100,897 | 8/1963 | Langer | 2/80 |
| 3,946,443 | 3/1976 | Knight | 2/84 |
| 4,117,609 | 11/1978 | Helt | 2/227 X |
| 4,783,856 | 11/1988 | Bouwens et al. | 2/87 |
| 4,823,404 | 4/1989 | Morrell et al. | 2/69 |
| 5,058,208 | 10/1991 | Adams | 2/69.5 X |
| 5,063,919 | 11/1991 | Silverberg | 2/59 X |
| 5,222,258 | 6/1993 | Mucci et al. | 2/101 X |

FOREIGN PATENT DOCUMENTS

| | | | |
|---|---|---|---|
| 1255207 | 1/1960 | France | 2/70 |

Primary Examiner—Jeanette E. Chapman

[57] ABSTRACT

A new and improved outer protective garment apparatus includes a torso covering assembly for protecting a torso of a wearer, a two-arm covering assembly connected to the torso covering assembly for protecting a wearer's arms, and a pants assembly connected to the torso covering assembly which includes an abdomen covering assembly and a two-leg covering assembly. The torso covering assembly includes an elastic, snugly-fitting, neck-encompassing assembly for snugly fitting around the wearer's neck and for protecting the wearer's torso from contamination by entry of a contaminant via the wearer's neck. Each of the arm covering assemblies includes an elastic, snugly-fitting, wrist-encompassing assembly for snugly fitting around wrists of the wearer for protecting the wearer's arms from contamination by entry of a contaminant via the wearer's wrists. Each of the leg covering assemblies includes an elastic, snugly-fitting, ankle-encompassing assembly for snugly fitting around an ankle of the wearer for protecting the wearer's legs from contamination by entry of a contaminant via the wearer's ankles. The torso covering assembly, the pants assembly, and the arm covering assembly may be formed into an unified integrated jumpsuit structure. In addition, the torso covering assembly, the pants assembly, and the arm covering assembly include material, such as the thermoplastic polyethylene which is capable of being joined at a seam by a heat weld.

5 Claims, 4 Drawing Sheets

FIG. 1
FIG. 2
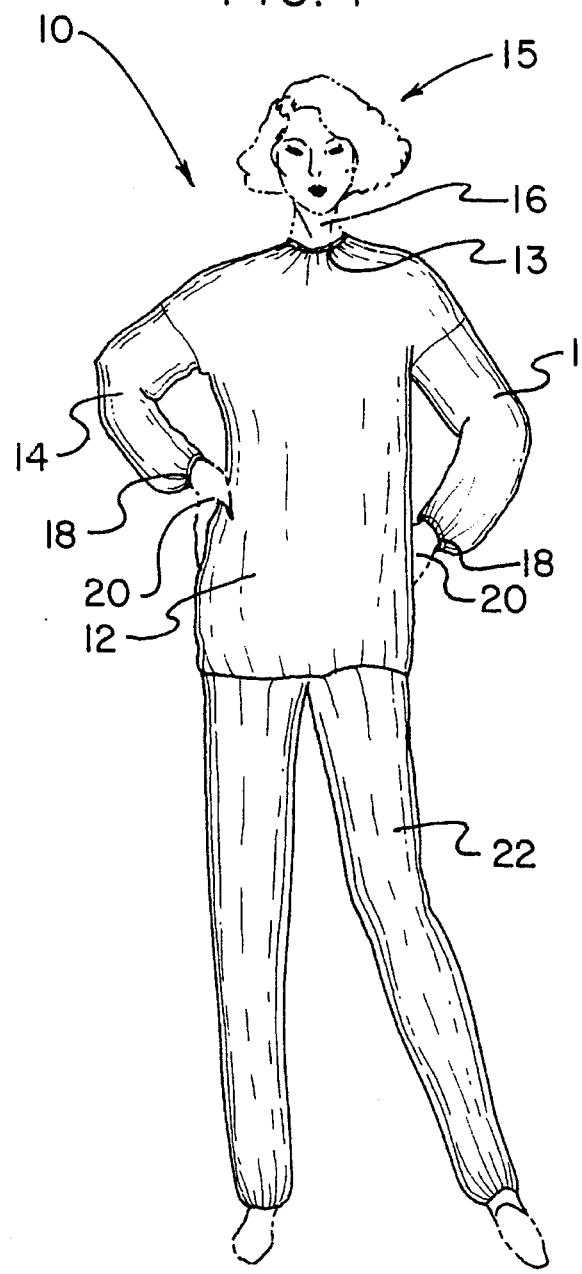
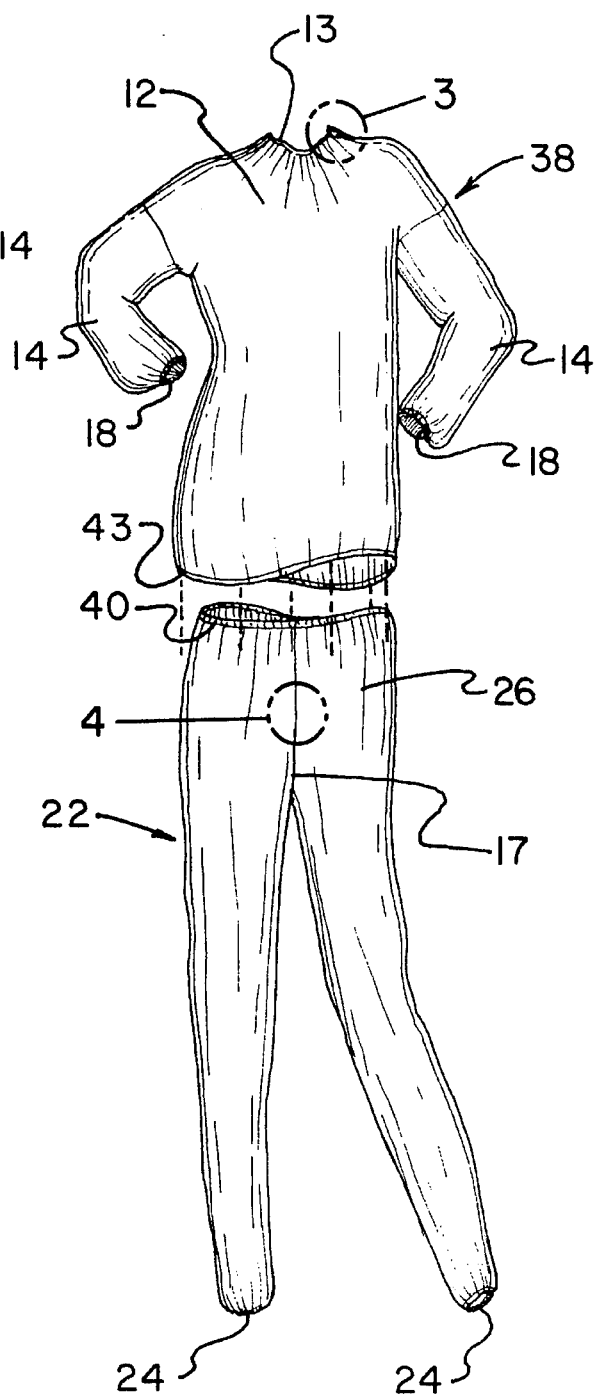

5,586,339

OUTER PROTECTIVE GARMENT APPARATUS

This application is a continuation of application Ser. No. 08/055,276, filed May 3, 1993, now abandoned.

BACKGROUND OF THE INVENTION

1. Field of the Invention

The present invention relates generally to protective garments that are worn over other garments, and more particularly, to an outer protective garment apparatus especially adapted to be inexpensively made and to be disposable.

2. Description of the Prior Art

Protective garments are well known in the art. For example, the following U.S. patents disclose a number of protective garments. U.S. Pat. No. 3,803,640 of Ericson discloses a surgeon's gown. As is generally the case with surgeon's gowns, the gown is tied at the back by a number of straps, thereby leaving unsealed seams for contamination to pass by the exterior of the gown and get behind the gown. In this respect, it would be desirable if a protective garment were provided that eliminates unsealed seams through which contamination can get inside the protective garment.

U.S. Pat. No. 3,946,443 of Knight discloses a disposable rain garment that is dispensed from a continuous sheet stored on a roller. U.S. Pat. No. 4,313,229 of Villafane disclose disposable rainwear especially adapted to be dispensed from a coin-operated machine. U.S. Pat. No. 4,625,337 of Zahn discloses a safety, brightly colored, rainsuit that includes a pocket for retaining desired items.

Although the disposable rainwear disclosed above may be effective in protecting the wearer from vertically falling rain drops, they are not effective in preventing contamination from getting behind the garment at the neck, wrist, and ankle areas. It would be desirable, therefore, if a protective garment were provided that prevented contamination from getting behind the garment at the neck, wrist, and ankle areas.

More specifically, in a medical environment, where exposure to blood and other body fluids may occur, it is especially important that the wearer of a protective garment be well protected. This is especially important when exposure to communicable diseases may occur upon exposure to the body fluids. Moreover, in a medical environment, it is often mandated or required by law, rule, or regulation, that personnel, for example medical emergency personnel, wear protective clothing. In this respect, it would be desirable if inexpensive, lightweight, flexible, and disposable protective clothing were provided.

In a medical environment, use of protective garments may also be very important to protect patients from exposure to contamination carried by medical personnel.

The U.S. Pat. No. 4,866,790 to Ross discloses a thin, polyethylene, heat joined, tuckaway, wind breaker garment that does not prevent contamination from getting behind the garment by way of the wearer's wrists and ankles. In this respect, it would be desirable if a thin, polyethylene, heat joined, garment were provided that prevents contamination from getting behind the garment by way of the wearer's wrists, ankles, and neck.

Theoretically, any protective garment can be deemed disposable if one is willing to pay a price for replacing a garment. However, from a practical standpoint, if a garment, such as a surgeon's gown, is made from relatively expensive material, is fabricated using a relatively large amount of expensive labor, is easily laundered and sterilized, is very durable, and can last for a long time if properly taken care of, then such a garment would normally be deemed to be not disposable. Moreover, a reusable garment often has expensive attributes that are designed to render the reusable garment reusable. The reusable garment may have a zipper or button/button hole combination. These closures enable reuse of the garment. Expensive hook and loop fastening material may also be used on reusable garments. More specifically, closures on a reusable garment are designed so that the garment is not destroyed when the garment is removed.

In contrast, a garment that is generally recognized as being disposable has a number of characteristics that render the garment disposable. The disposable garment is made from inexpensive material, is manufactured by relatively simple techniques, and does not require much expensive labor for its production. In addition, with the disposable protective garment, destruction of the garment when it is removed is not avoided thereby precluding the use of expensive reusable closures.

Thus, while the foregoing body of prior art indicates it to be well known to use disposable protective rain gear, the prior art described above does not teach or suggest a disposable protective garment that eliminates unsealed seams through which contamination can get inside the protective garment. Also, the prior art does not provide a protective garment that prevents contamination from getting behind the garment at the neck, wrist, and ankle areas. In addition, the prior art does not provide a disposable, thin, polyethylene, heat joined, garment that prevents contamination from getting behind the garment by way of the wearer's wrists, ankles, and neck. In addition, the prior art does not provide a disposable garment made from inexpensive material, manufactured by relatively simple techniques, and not requiring much expensive labor for its production. The prior art does not provide a disposable protective garment, for which destruction of the garment when it is removed is not avoided thereby avoiding the use of expensive reusable closures. The foregoing disadvantages are overcome by the unique outer protective garment apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved outer protective garment apparatus which includes a torso covering assembly for protecting a torso of a wearer, a two-arm covering assembly connected to the torso covering assembly for protecting a wearer's arms, and a pants assembly connected to the torso covering assembly which includes an abdomen covering assembly and a two-leg covering assembly. The torso covering assembly includes an elastic, snugly-fitting, neck-encompassing assembly for snugly fitting around the wearer's neck and for protecting the wearer's torso from contamination by entry of a contaminant via the wearer's neck. Each of the arm covering assemblies includes an elastic, snugly-fitting, wrist-encompassing assembly for snugly fitting around wrists of the wearer for protecting the wearer's arms from contamination by entry of a contaminant via the wearer's wrists. Each of the leg covering assemblies include an elastic, snugly-fitting, ankle-encompassing assembly for snugly fitting around an ankle of the wearer for protecting the wearer's legs from contamination by entry of a contaminant via the wearer's ankles. The torso covering assembly, the pants assembly, and the arm covering assembly may be formed into an unified integrated jumpsuit structure. In addition, the torso covering assembly, the pants assembly, and the arm covering assembly include material, such as the thermoplastic material polyethylene which is capable of being joined at a seam by a heat weld.

In another embodiment, the torso covering assembly includes a first side assembly and a second side assembly, wherein the first side assembly includes a strip of contact adhesive material covered by a barrier sheet, such that the torso covering assembly can be put on by the wearer, the barrier sheet can be removed, and the first side assembly can be adhered to the second side assembly to seal the garment shut.

The elastic, snugly-fitting, neck-encompassing assembly, the elastic, snugly-fitting, wrist-encompassing assembly, and the elastic, snugly-fitting, ankle-encompassing assembly include an elastic element and include material capable of being joined at a seam by a heat weld. In addition, the pants assembly may include an elastic, snugly-fitting, abdomen-encompassing assembly. The torso covering assembly and the arm covering assembly may be formed into a unified integrated structure.

The torso covering assembly may include an elastic, snugly-fitting, abdomen-encompassing assembly. The torso covering assembly, the pants assembly, and the arm covering assembly may include thermoplastic material that is transparent.

The torso covering assembly includes an interior surface and an exterior surface. In one embodiment, a rip cord is attached to the interior surface of the torso covering assembly, such that when the rip cord is pulled in a direction outward from the interior surface, the torso covering assembly is torn apart by the rip cord, permitting removal of the outer protective garment apparatus. Similarly, the rip cord may be attached to the interior surface of the pants assembly, such that when the rip cord is pulled in a direction outward from the interior surface, the pants assembly is torn apart by the rip cord, permitting removal of the outer protective garment apparatus.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved outer protective garment apparatus which has all of the advantages of the prior art and none of the disadvantages.

It is another object of the present invention to provide a new and improved outer protective garment apparatus which may be easily and efficiently manufactured and marketed.

It is a further object of the present invention to provide a new and improved outer protective garment apparatus which is of durable and reliable construction.

An even further object of the present invention is to provide a new and improved outer protective garment apparatus which is susceptible of a low cost of manufacture with regard to both materials and labor, and which accordingly is then susceptible of low prices of sale to the consuming public, thereby making such outer protective garment apparatus available to the buying public.

Still yet a further object of the present invention is to provide a new and improved outer protective garment apparatus that eliminates unsealed seams through which contamination can get inside the protective garment.

Still another object of the present invention is to provide a new and improved outer protective garment apparatus that prevents contamination from getting behind the garment at the neck, wrist, and ankle areas.

Yet another object of the present invention is to provide a new and improved outer protective garment apparatus that employs a thin, polyethylene, heat joined, garment that prevents contamination from getting behind the garment by way of the wearer's wrists, ankles, and neck.

Even another object of the present invention is to provide a new and improved outer protective garment apparatus disposable garment that is made from inexpensive material, that is manufactured by relatively simple techniques, and that does not require much expensive labor for its production.

Still a further object of the present invention is to provide a new and improved outer protective garment apparatus which is destroyed when removed thereby avoiding the use of expensive reusable closures.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a side view of a person wearing a first preferred embodiment of the outer protective garment apparatus of the invention which is a two-piece garment.

FIG. 2 is an exploded side view of two-piece embodiment of the outer protective garment apparatus of the invention shown in FIG. 1.

DESCRIPTION OF THE PREFERRED EMBODIMENT

Figure 3:
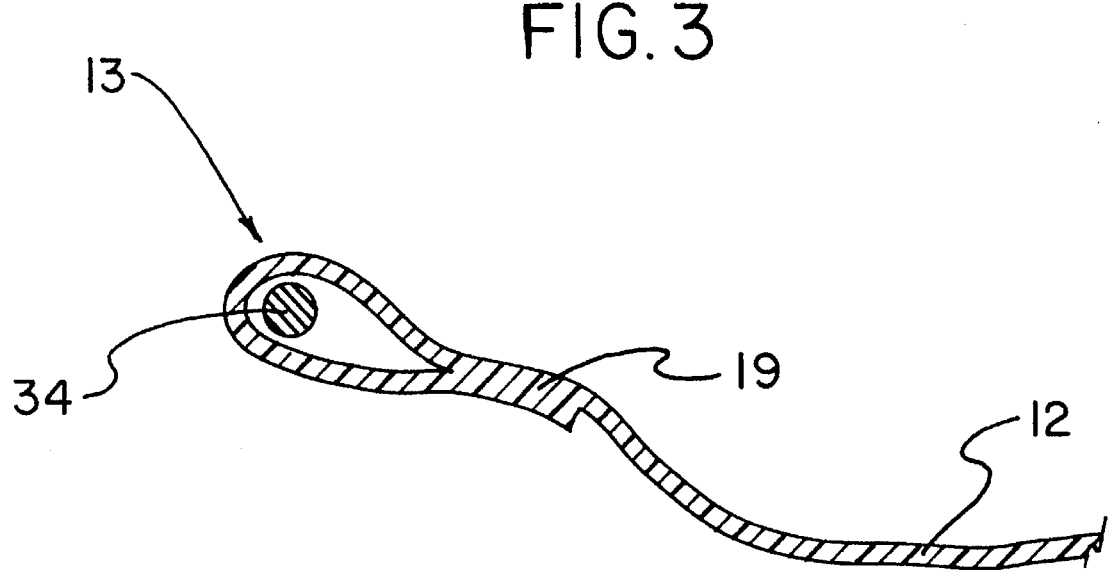
FIG. 3 is an enlarged, cross-sectional view of the embodiment of the outer protective garment apparatus of FIG. 2 contained in the circled region 3 in FIG. 2 showing an elastic, snugly-fitting, neck-encompassing assembly.

With reference to the drawings, a new and improved outer protective garment apparatus embodying the principles and concepts of the present invention will be described.

Turning initially to FIGS. 1–4, there is shown a first exemplary embodiment of the outer protective garment apparatus of the invention generally designated by reference numeral 10. In its preferred form, outer protective garment apparatus 10 includes a torso covering assembly 12 for protecting a torso of a wearer 15. The torso covering assembly 12 includes an elastic, snugly-fitting, neck-encompassing assembly 13 for snugly fitting around the wearer's neck 16 and for protecting the wearer's torso from contamination by entry of a contaminant via the wearer's neck 16.

A two-arm covering assembly 14 is connected to the torso covering assembly 12 and is for protecting a wearer's arms. Each of the arm covering assemblies 14 includes an elastic, snugly-fitting, wrist-encompassing assembly 18 for snugly fitting around a wrist 20 of the wearer 15 and for protecting the wearer's arms from contamination by entry of a contaminant via the wearer's wrists 20. Each of the arm covering assemblies 14 can be in the form of raglan sleeves.

A pants assembly 22 is connected to the torso covering assembly 12. The pants assembly 22 includes an abdomen covering assembly 26 and two leg covering assemblies 28. Each of the leg covering assemblies 28 includes an elastic, snugly-fitting, ankle-encompassing assembly 24 for snugly fitting around an ankle 30 of the wearer 15 and for protecting the wearer's legs and abdomen from contamination by entry of a contaminant via the wearer's ankles 30.

Figure 4:
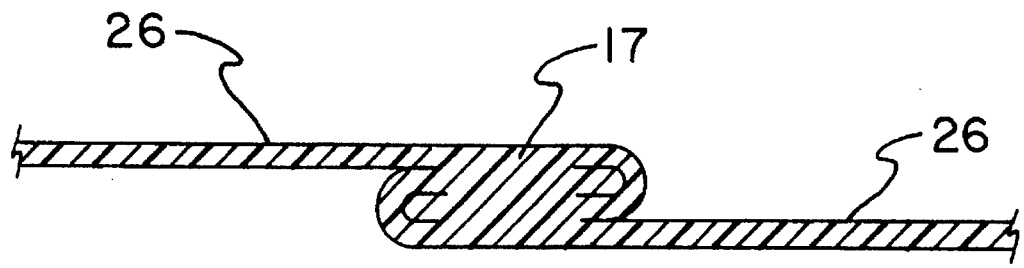
FIG. 4 is an enlarged, cross-sectional view of the embodiment of the outer protective garment apparatus of FIG. 2 contained in the circled region 4 in FIG. 2 showing a seam formed by a heat weld.
Figure 5:
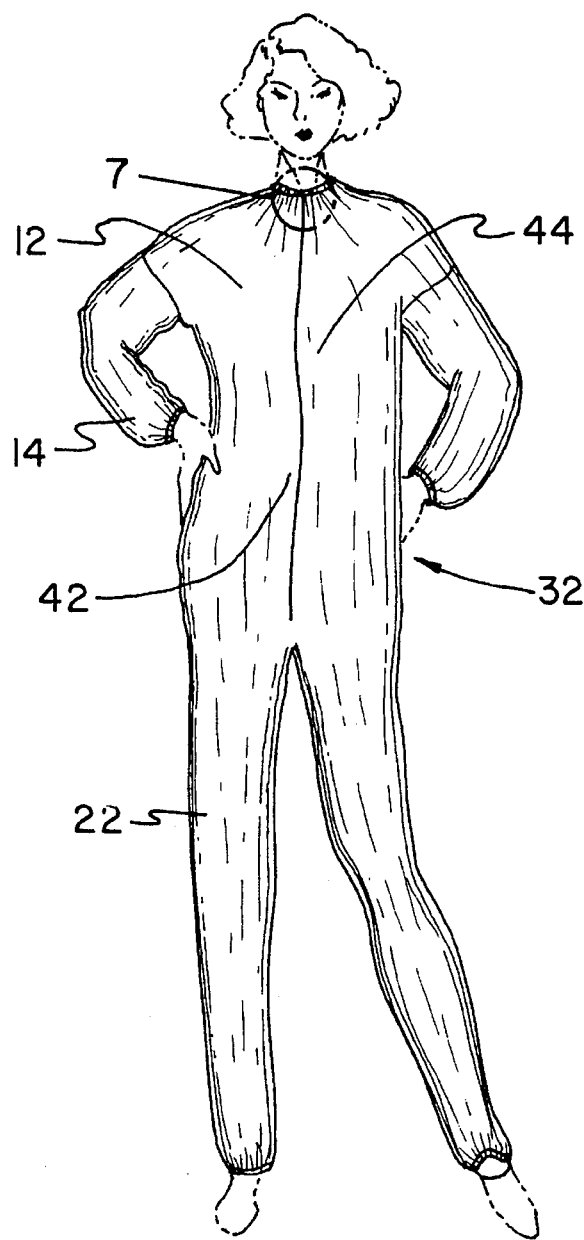
FIG. 5 is a front view of a second preferred embodiment of the outer protective garment apparatus of the invention showing a jumpsuit worn by a person.

The torso covering assembly 12, the pants assembly 22, and the arm covering assembly 14 include thermoplastic polyethylene material that is capable of being joined at a first seam 17 by a heat weld. The polyethylene material is transparent and is very flexible and lightweight. As shown in FIG. 3, the first seam 17 is formed by heat welds which form a single melted region. Similarly, as shown in FIG. 4, the second seam 19 is formed by heat welds which form a single melted region.

In addition, the elastic, snugly-fitting, neck-encompassing assembly 13, the elastic, snugly-fitting,-wrist-encompassing assembly 18, and the elastic, snugly-fitting, ankle-encompassing assembly 24 include an elastic element 34 and include thermoplastic polyethylene material capable of being joined at a second seam 19 by a heat weld.

The pants assembly 22 includes an elastic, snugly-fitting, abdomen-encompassing assembly 40. The bottom 41 of the torso assembly 12 includes an elastic, snugly-fitting, abdomen-encompassing assembly 43. The torso covering assembly 12 and the arm covering assembly 14 are formed into a unified integrated structure 38.

Turning to FIGS. 5–9, a second embodiment of the outer protective garment apparatus 10 of the invention is shown. Reference numerals are shown that correspond to like reference numerals that designate like elements shown in the other figures. In addition, the torso covering assembly 12, the pants assembly 22, and the arm covering assemblies 14 are formed into an unified integrated jumpsuit structure 32.

Figure 7:
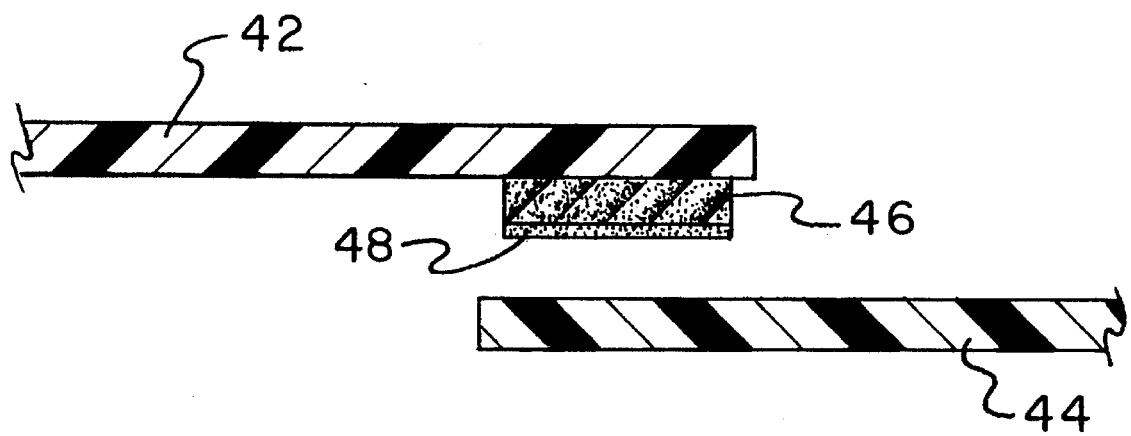
FIG. 7 is a cross-sectional view of the portion of the embodiment shown in FIG. 5 that is included in the circled region 7 that shows a strip of contact adhesive material covered by a barrier sheet used before the adhesive material is used to secure a first side assembly and a second side assembly of a torso covering assembly.
Figure 8:
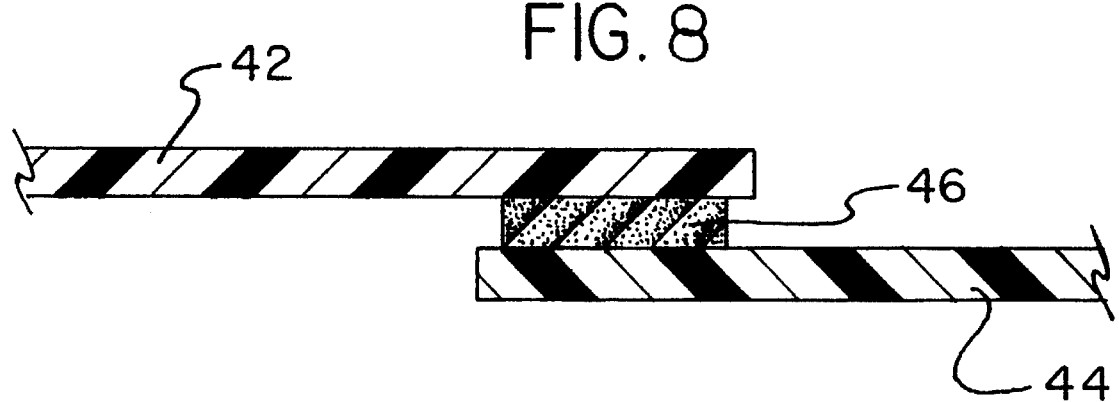
FIG. 8 is a cross-sectional view of the strip of contact adhesive material shown in FIG. 7, with the barrier sheet removed, used to used to secure a first side assembly and a second side assembly of a torso covering assembly.

Also, the torso covering assembly 12 includes a first side assembly 42 and a second side assembly 44. As shown in FIG. 7, the first side assembly 42 includes a strip 46 of contact adhesive material covered by a barrier sheet 48, such that first and second side assemblies can be separated to open the protective garment; and the torso covering assembly 12 can be put on by the wearer. After the garment is put on by the person, the barrier sheet 48 can be removed (as shown in FIG. 8); and the first side assembly 42 can be adhered to the second side assembly 44 by means of the adhesive strip 46.

Figure 6:
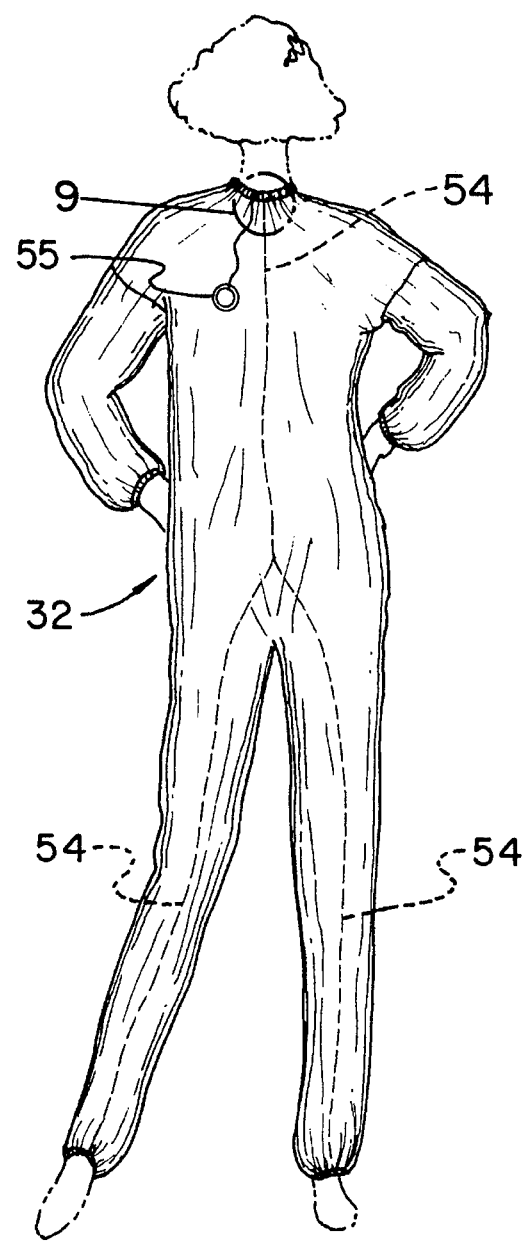
FIG. 6 is a back view of the embodiment of the invention shown in FIG. 5.
Figure 9:
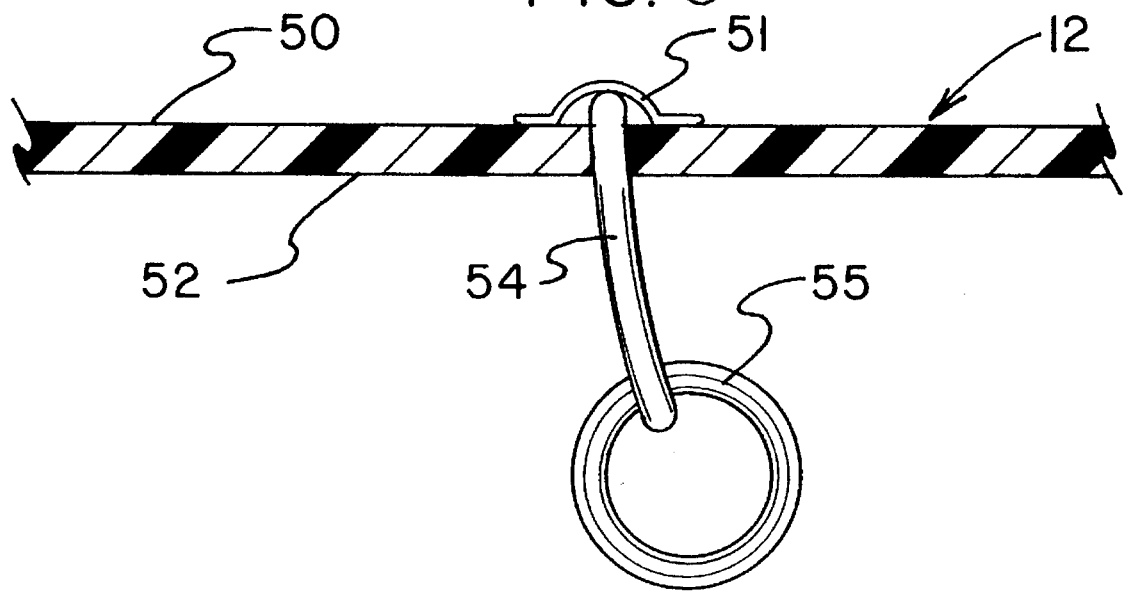
FIG. 9 is a cross-sectional view of the portion of the embodiment shown in FIG. 6 that is included in the circled region 9 that shows a rip cord used with the embodiment of the invention shown in FIG. 6.

As shown in FIGS. 6 and 9, the torso covering assembly 12 includes an interior surface 50 and an exterior surface 52. A rip cord 54, which includes a grap ring 55 is attached to the interior surface 50 of the torso covering assembly 12, such that when the rip cord 54 is pulled in a direction outward from the interior surface 50, the torso covering assembly 12 is torn apart by the rip cord 54, permitting removal of the outer protective garment apparatus. Similarly, the rip cord 54 branches and passes down the pants assembly 22, such that when the rip cord 54 is pulled in a direction outward from the interior surface of the pants assembly 22, the pants assembly 22 is torn apart by the rip cord 54, permitting removal of the outer protective garment apparatus. The rip cord 54 can be retained in place on the interior surface 50 by a strip of contact adhesive tape 51.

It is apparent from the above that the present invention accomplishes all of the objects set forth by providing a new and improved outer protective garment apparatus that is low in cost, relatively simple in design and operation, and which may advantageously be used to prevent contamination from getting behind the garment via the neck, wrist, waist, and ankle areas. With the invention, a disposable protective garment is provided that eliminates unsealed seams through which contamination can get inside the protective garment. With the invention, a protective garment is provided that employs a thin, polyethylene, heat joined, garment. Also, with the invention, a disposable protective garment is made from inexpensive material, is manufactured by relatively simple techniques, and does not require much expensive labor for its production. With the disposable protective garment of the invention, destruction of the garment when it is removed is not avoided thereby avoiding the use of expensive reusable closures. With the invention, an inexpensive, lightweight, flexible, transparent, and disposable protective garment is provided.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved outer protective garment apparatus, comprising:

torso covering assembly means for protecting a torso of a wearer, said torso covering assembly means including an elastic, snugly-fitting, neck-encompassing assembly means for snugly fitting around the wearer's neck and for protecting the wearer's torso from contamination by entry of a contaminant via the wearer's neck, two arm covering assembly means, connected to said torso covering assembly means, for protecting a wearer's arms, each of said arm covering assembly means including an elastic, snugly-fitting, wrist-encompassing assembly means for snugly fitting around a wrist of the wearer and for protecting the wearer's arms from contamination by entry of a contaminant via the wearer's wrists, and pants assembly means, connected to said torso covering assembly means, said pants assembly means including an abdomen covering assembly means and two leg covering assembly means, each of said leg covering assembly means including an elastic, snugly-fitting, ankle-encompassing assembly means for snugly fitting around an ankle of the wearer and for protecting the wearer's legs and abdomen from contamination by entry of a contaminant via the wearer's ankles, wherein each of said elastic, snugly-fitting, neck-encompassing assembly means, said elastic, snugly-fitting, wrist-encompassing assembly means, and said elastic, snugly-fitting, ankle-encompassing assembly means includes an elastic element and includes thermoplastic material which retains said elastic element by a seam joined by heat welds which form a single melted region, wherein said torso covering assembly means and said arm covering assembly means are formed into a unified integrated structure, wherein said torso covering assembly means includes a first side assembly and a second side assembly, wherein said first side assembly includes a strip of contact adhesive material covered by a barrier sheet, such that said torso covering assembly means can be put on by the wearer, said barrier sheet can be removed, and said first side assembly can be adhered to said second side assembly, wherein said torso covering assembly means further includes an interior surface and an exterior surface, a rip cord is attached to said interior surface of said torso covering assembly means, such that when said rip cord is pulled in a direction outward from said interior surface, said torso covering assembly means is torn apart by said rip cord, permitting removal of the outer protective garment apparatus, wherein the said pants assembly includes an interior surface and an exterior surface and said rip cord is also attached to said interior surface of said pants assembly means, such that when said rip cord is pulled in a direction outward from said interior surface, said pants assembly means is torn apart by said rip cord, permitting removal of the outer protective garment apparatus.

2. The apparatus described in claim 1 wherein said torso covering assembly means, said pants assembly means, and said arm covering assembly means are formed into an unified integrated jumpsuit structure.

3. The apparatus described in claim 1 wherein said thermoplastic material is comprised of polyethylene.

4. The apparatus described in claim 1 wherein said torso covering assembly means and said arm covering assembly means are formed into a unified integrated structure.

5. The apparatus described in claim 1 wherein said torso covering assembly means, said pants assembly means, and said arm covering assembly means include thermoplastic material that is transparent.

* * * * *